(12) United States Patent
Dellock et al.

(10) Patent No.: US 10,168,039 B2
(45) Date of Patent: Jan. 1, 2019

(54) ILLUMINATED BADGE FOR A VEHICLE

(71) Applicant: Ford Global Technologies, LLC, Dearborn, MI (US)

(72) Inventors: Paul Kenneth Dellock, Northville, MI (US); Stuart C. Salter, White Lake, MI (US); Joseph Myszka, Livonia, MI (US); Mandeep Singh Sidhu, Redford, MI (US); Daniel Zilinskas, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 14/876,355

(22) Filed: Oct. 6, 2015

(65) Prior Publication Data

US 2017/0043709 A1  Feb. 16, 2017

Related U.S. Application Data

(60) Provisional application No. 62/203,257, filed on Aug. 10, 2015.

(51) Int. Cl.
*B60Q 1/00* (2006.01)
*F21V 23/00* (2015.01)
(Continued)

(52) U.S. Cl.
CPC .......... *F21V 23/003* (2013.01); *B60Q 1/2607* (2013.01); *B60Q 1/28* (2013.01); *B60Q 1/50* (2013.01); *F21S 43/14* (2018.01); *F21S 43/19* (2018.01); *F21S 43/241* (2018.01); *F21S 43/243* (2018.01); *F21S 43/249* (2018.01); *F21S 43/31* (2018.01); *F21S 48/211* (2013.01); *F21S 48/215* (2013.01); *F21S 48/225* (2013.01); *F21S 48/2262* (2013.01); *F21S 48/2281* (2013.01); *F21S 48/234* (2013.01); *G02B 6/0068* (2013.01); *G02B 6/0073* (2013.01); *G02B 6/0075* (2013.01); *G09F 13/04* (2013.01);
(Continued)

(58) Field of Classification Search
CPC ........ B60Q 1/2619; G02B 6/42; G02B 6/006; G02B 6/0075; G02B 6/0068
USPC ......................................................... 362/511
See application file for complete search history.

(56) References Cited

U.S. PATENT DOCUMENTS 2,486,859 A    11/1949  Meijer et al.
4,965,950 A *  10/1990  Yamada ................... B60Q 1/56
                                                                362/613
(Continued)

FOREIGN PATENT DOCUMENTS

CN    101337492 A    1/2009
CN    201169230 Y    2/2009
(Continued)

*Primary Examiner* — Julie A Bannan
(74) *Attorney, Agent, or Firm* — Jason Rogers; Price Heneveld LLP

(57) ABSTRACT

A badge is provided herein. The badge includes a viewable portion having indicia thereon. A plurality of first LED sources is configured to emit light toward the viewable portion. A light guide extends between the viewable portion and the first LED sources. A plurality of second LED sources is configured to emit light toward the viewable portion. The first LED sources illuminate a first region of the viewable portion and the second LED sources illuminate a second region of the viewable portion.

12 Claims, 10 Drawing Sheets

(51) Int. Cl.
*F21V 8/00* (2006.01)
*F21S 43/31* (2018.01)
*F21S 43/241* (2018.01)
*F21S 43/249* (2018.01)
*F21S 43/243* (2018.01)
*F21S 43/14* (2018.01)
*F21S 43/19* (2018.01)
*B60Q 1/26* (2006.01)
*B60Q 1/28* (2006.01)
*B60Q 1/50* (2006.01)
*F21S 8/10* (2006.01)
*G09F 13/04* (2006.01)
*G09F 7/18* (2006.01)
*G09F 13/22* (2006.01)

(52) U.S. Cl.
CPC .............. *G09F 2007/1882* (2013.01); *G09F 2013/044* (2013.01); *G09F 2013/222* (2013.01); *G09F 2013/227* (2013.01)

(56) References Cited

U.S. PATENT DOCUMENTS

| | | | |
|---|---|---|---|
| 5,053,930 A | 10/1991 | Benavides | |
| 5,063,379 A * | 11/1991 | Fabry | B60K 35/00 340/815.42 |
| 5,434,013 A | 7/1995 | Fernandez | |
| 5,555,161 A * | 9/1996 | Roe | F16H 63/42 116/202 |
| 5,709,453 A | 1/1998 | Krent et al. | |
| 5,829,861 A * | 11/1998 | Carter | G01D 11/28 362/23.18 |
| 5,839,718 A | 11/1998 | Hase et al. | |
| 6,031,511 A | 2/2000 | DeLuca et al. | |
| 6,117,362 A | 9/2000 | Yen et al. | |
| 6,294,990 B1 * | 9/2001 | Knoll | B60Q 1/54 340/438 |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,066,630 B1 * | 6/2006 | Venkatram | G01D 7/04 362/23.16 |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,387,418 B2 * | 6/2008 | Gandorfer | G09F 9/305 116/28.1 |
| 7,441,913 B2 * | 10/2008 | Bayersdorfer | F16H 59/0278 362/23.11 |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,128,248 B2 * | 3/2012 | Feit | G01D 11/28 116/DIG. 5 |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,870,433 B2 * | 10/2014 | Um | G02B 6/0078 362/616 |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0135994 A1 * | 9/2002 | Ikarashi | G01D 11/28 362/23.2 |
| 2002/0159741 A1 | 10/2002 | Graves et al. | |
| 2002/0163792 A1 | 11/2002 | Formosa | |
| 2003/0167668 A1 | 9/2003 | Fuks et al. | |
| 2003/0173496 A1 * | 9/2003 | Glienicke | B60Q 3/64 250/205 |
| 2003/0179548 A1 | 9/2003 | Becker et al. | |
| 2004/0213088 A1 | 10/2004 | Fuwausa | |
| 2005/0007751 A1 * | 1/2005 | Tsai | G09F 13/04 362/23.16 |
| 2005/0084229 A1 | 4/2005 | Babbitt et al. | |
| 2005/0140848 A1 * | 6/2005 | Yoo | G02B 6/0043 349/64 |
| 2005/0189795 A1 | 9/2005 | Roessler | |
| 2006/0087826 A1 | 4/2006 | Anderson, Jr. | |
| 2006/0097121 A1 | 5/2006 | Fugate | |

(56) References Cited

U.S. PATENT DOCUMENTS

| | | | |
|---|---|---|---|
| 2006/0291233 A1* | 12/2006 | Kwon | B60Q 1/50 362/540 |
| 2007/0032319 A1 | 2/2007 | Tufte | |
| 2007/0194891 A1* | 8/2007 | Solow | B60Q 1/50 340/425.5 |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2008/0253140 A1* | 10/2008 | Fleischmann | B60Q 1/2696 362/487 |
| 2009/0109650 A1* | 4/2009 | Winkler | G04B 19/30 362/23.16 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0064962 A1* | 3/2010 | Birman | G01D 11/28 116/288 |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0256543 A1* | 10/2012 | Marcove | B60Q 1/2607 315/77 |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0286052 A1* | 9/2014 | McCollum | G02B 6/0078 362/613 |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0217684 A1* | 8/2015 | Frens | G01D 11/28 362/23.14 |
| 2015/0241016 A1* | 8/2015 | Sura | B60Q 1/56 362/509 |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0253179 A1 | 9/2017 | Kumada | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

ILLUMINATED BADGE FOR A VEHICLE

CROSS-REFERENCE TO RELATED APPLICATION

This patent application claims benefit to U.S. Provisional Patent Application No. 62/203,257, which was filed on Aug. 10, 2015, entitled "ILLUMINATED BADGE FOR A VEHICLE." The aforementioned related application is hereby incorporated by reference in its entirety.

FIELD OF THE INVENTION

The present disclosure generally relates to vehicle lighting systems, and more particularly, to an illuminated badge employing a plurality of light sources therein.

BACKGROUND OF THE INVENTION

Illumination arising from the use of a plurality of light sources offers a unique and attractive viewing experience. It is therefore desired to implement such structures in automotive vehicles for various lighting applications.

SUMMARY OF THE INVENTION

According to one aspect of the present invention, a badge is disclosed. The badge includes a viewable portion having indicia thereon. A plurality of first LED sources is configured to emit light toward the viewable portion. A light guide extends between the viewable portion and the first LED sources. A plurality of second LED sources is configured to emit light toward the viewable portion. The first LED sources illuminate a first region of the viewable portion and the second LED sources illuminate a second region of the viewable portion.

According to another aspect of the present invention, a badge for a vehicle is disclosed. The badge includes a housing having a viewable portion. The viewable portion has indicia thereon and a background region. A first light source is configured to illuminate the indicia. A second light source is configured to illuminate the background region.

According to yet another aspect of the present invention, a badge is disclosed. The badge includes a housing having a viewable portion. Indicia are disposed proximately to the viewable portion. A plurality of first LED sources is disposed within the housing configured to emit light through the viewable portion. A light guide is disposed above the first LED sources and below the indicia. Each of the first LED sources is independently illuminated and light emitted therefrom escapes the badge through the viewable portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
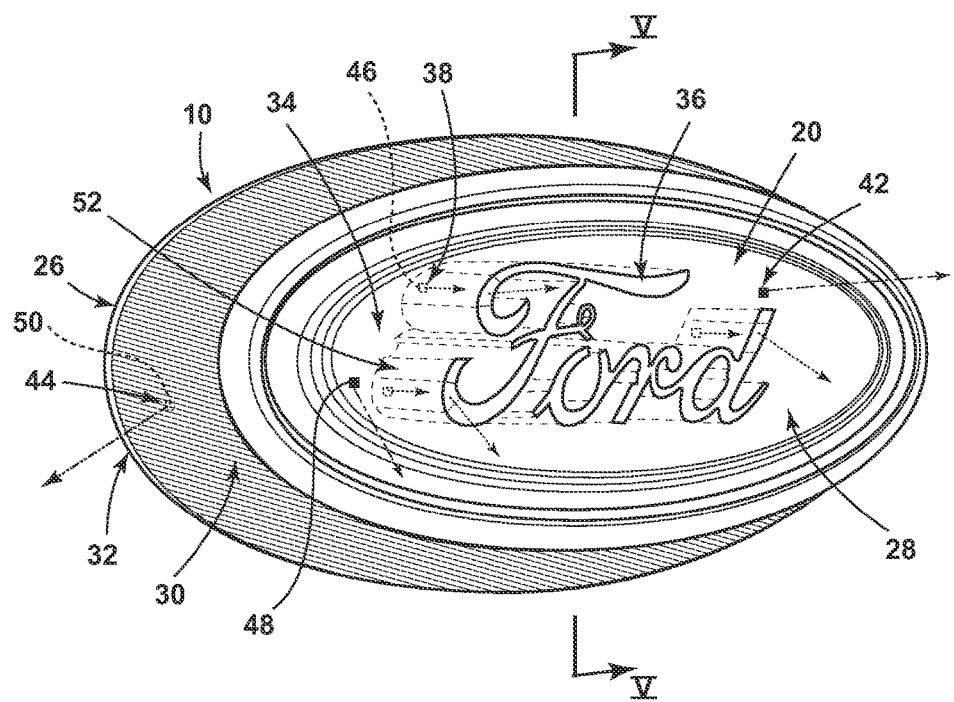
FIG. 2 is a perspective view of the badge according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge for a vehicle. The badge may advantageously employ one or more light sources configured to illuminate at pre-defined frequencies. The badge may further include one or more light guides configured to direct sequentially illuminated light sources through a portion of the badge based on a pre-defined pattern.

Figure 1:
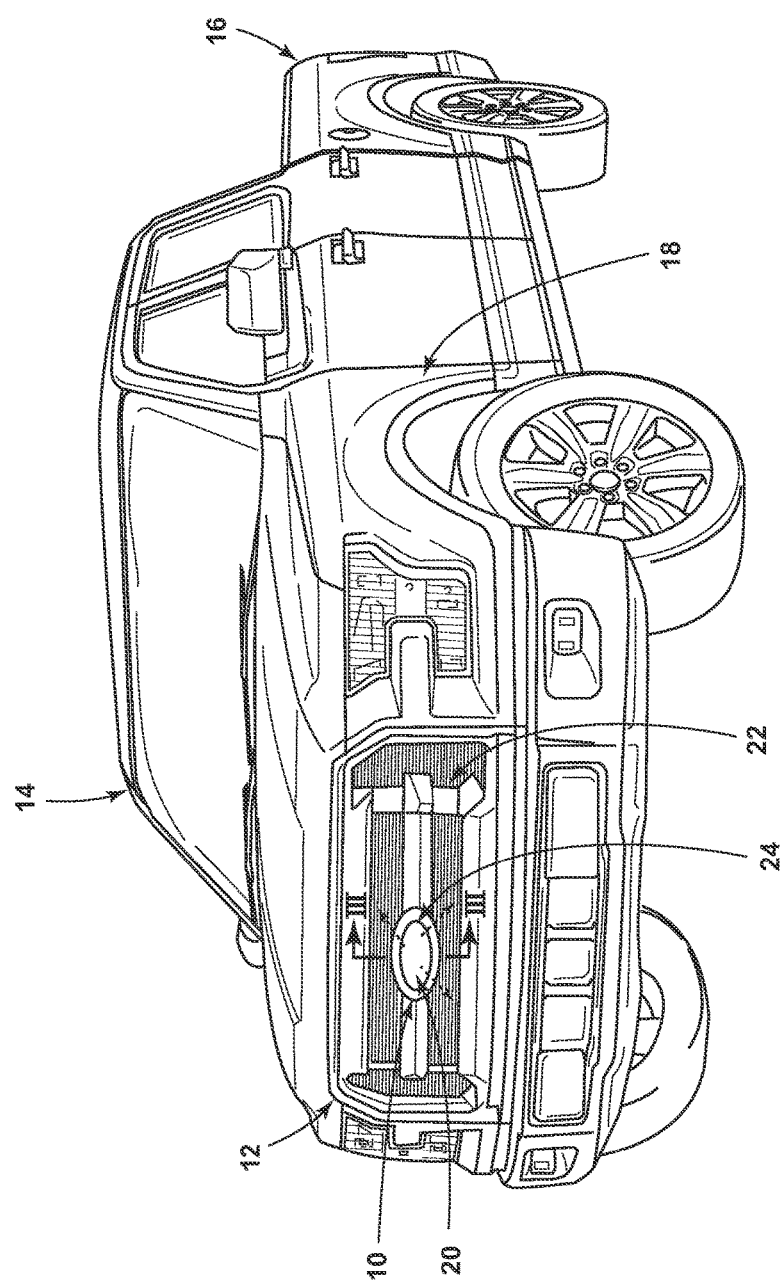
FIG. 1 is a perspective view of a badge mounted to a front portion of a vehicle.

Referring to FIG. 1, a badge 10 is generally shown mounted on a front end 12 of a vehicle 14. In other embodiments, the badge 10 may be located elsewhere, such as, but not limited to, the rear portion 16 or side(s) 18 of the vehicle 14. The badge 10 may be configured as an insignia that is presented as an identifying mark of a vehicle manufacturer and includes a viewable portion 20 that is generally prominently displayed on the vehicle 14. In the presently illustrated embodiment, the badge 10 is centrally located on a grille assembly 22, thus allowing the badge 10 to be readily viewed by an observer looking head on at the vehicle 14. As will be described below in greater detail, light sources 24 within the badge 10 may sequentially illuminate to provide a distinct styling element to the vehicle 14.

Referring to FIG. 2, the badge 10 is exemplarily shown according to one embodiment having a housing 26 that includes the viewable portion 20 centrally located on a forward portion 28 thereof, a peripheral portion 30, and a rear portion 32. The viewable portion 20 may be made of a transparent and/or translucent material that includes a background region 34 and indicia 36. The indicia 36 may signify the make, model, or any other information that may be desirable to confer about the vehicle 14 upon which the badge 10 is attached to.

A first light source 38 is disposed within a portion of the badge 10. The first light source 38 may include any form of light source. For example fluorescent lighting, light emitting diodes (LEDs), organic LEDs (OLEDs), polymer LEDs (PLEDs), solid state lighting, or any other form of lighting configured to emit light may be utilized. The light source 38 may be powered by a vehicle power supply 40 (FIG. 10) or any other power supply 40 disposed onboard the vehicle 14. The light source 38 is disposed rearwardly of and orientated towards the viewable portion 20.

As illustrated, the badge 10 includes first, second, and third light sources 38, 42, 44 each configured to illuminate a portion of the badge 10. The first light source 38 is configured as a plurality of first LED sources 46 that emit light through the indicia 36 on the viewable portion 20 of the badge 10. The second light source 42 is configured as a plurality of second LED sources 48 that emit light through the background region 34. The plurality of second LED sources 48 may be configured to emit light of varied intensities or wavelengths such that the background region 34 may have perceived shaded regions. The third light source 44 may be configured as a third plurality of LED sources that emit light through a peripheral portion 30 of the badge 10. Each light source 38, 42, 44 may emit any desired color of light. According to one embodiment, each light source 38, 42, 44 emits a different color of light therefrom. For example, the first light source 38 may emit a neutral white light, the second light source 42 may emit blue light, and the third light source 44 may emit bright white light. It should be appreciated, however, that the badge 10 might include any number of light sources 38, 42, 44 that illuminate in any desired color without departing from the teachings provided herein.

Light emitted from the plurality of first LED sources 46 may be directed through one or more light guides 52 towards pre-defined locations disposed proximately to the viewable portion 20 of the badge 10, thereby causing indicia 36 on the viewable portion 20, or indicia 36 formed from the light guides 52 to illuminate. According to one embodiment, the indicia 36 may illuminate when a plurality of first LED sources 46 is illuminated and the background region 34 may illuminate when a plurality of second LED sources 48 is illuminated.

Each LED source 46, 48, 50 within the badge 10 may be independently operated to emit light onto a predefined location and/or desired region of the badge 10. For example, according to one embodiment, the first light source 38 includes about 80 independently controlled LED sources. According to the same embodiment, the second light source 42 includes about 100 independently controlled second LED sources 48 and the third light source 44 includes about 40 independently controlled third LED sources 50.

With further reference to FIG. 2, according to one embodiment, a controller 54 (FIG. 10) is configured to illuminate the plurality of first LED sources 46 in a sequential manner. Particularly, the plurality of first LED sources 46 is activated so that a first end portion of a first letter of indicia 36 is illuminated first. In sequence, adjacently disposed first LED sources 46 are sequentially illuminated. Once all of the first LED sources 46 forming the first letter are illuminated, a first LED source 46 disposed at one end portion of a second letter illuminates until each letter of the indicia 36 is progressively illuminated. Once all of the first LED sources 46 that form the first light source 38 are illuminated, the first LED sources 46 stay lit until the controller 54 returns each first LED source 46 to an unilluminated state. In other words, as each additional first LED source 46 is illuminated, the first LED sources 46 that were previously illuminated stay lit, until all of the first LED sources 46 are illuminated. The time period that first LED source 46 is illuminated before the adjacently disposed first LED source 46 is illuminated can be selectively set by a time constant in the controller 54.

The controller 54 that controls the sequential illumination of the first LED sources 46 can be any circuit suitable for the purposes described herein. According to one embodiment, the controller 54 delays 75 milliseconds between illumination of each respective first LED source 46. This sequence repeats by lighting the adjacently disposed first LED source 46 until each first LED source 46 within the first light source 38 is illuminated. According to one embodiment, the time period of the sequence until the center LED is illuminated may be 3 seconds. All of the first LED sources 46 may maintain an illuminated state for a predefined time, such as 5 seconds, giving the time of the sequence to be 8 seconds. The sequence may be then repeated. It should be understood that the time values given herein are for exemplary purposes by way of a non-limiting example.

Additionally, a variable current may be supplied to each light source 38, 42, 44 to adjust the degree of illumination emitted from each light source 38, 42, 44. For example, the current may vary from 1 to 5 times the steady state current. Moreover, any light source 38, 42, 44 disposed within the badge 10 may illuminate in a plurality of colors and/or hues based on the wavelength emitted from each light source 38, 42, 44 and/or the intensity of light emitted therefrom.

Figure 3:
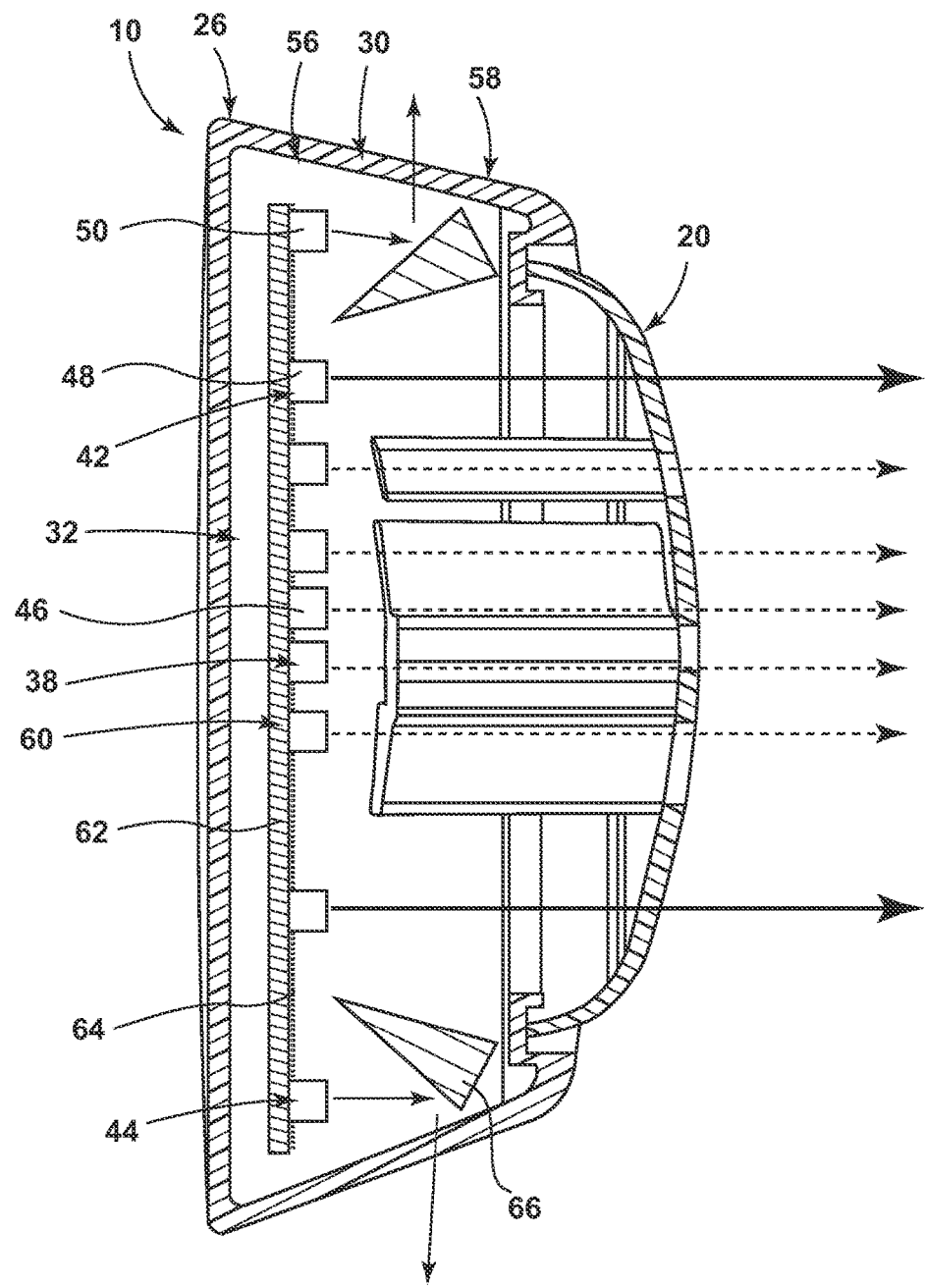
FIG. 3 is a cross-sectional view of the badge taken along lines III-III of FIG. 1 having a plurality of light sources disposed proximately to a plurality of light guides that terminate near to a viewing portion.

Referring to FIG. 3, a cross-sectional view of the badge 10 taken along the line III-III of FIG. 1 is shown illustrating one embodiment of the illuminated badge 10. The badge 10 includes a housing 26 having the viewable portion 20 described above, the peripheral portion 30, and the rear portion 32 that may be capable of being secured to a vehicle 14. According to the illustrated embodiment, the viewable portion 20 may be arcuate whereas the rear portion 32 may be substantially linear. However, it should be appreciated that the badge 10, and portions thereof, may be configured in any desired and/or practicable shape. According to one embodiment, the viewable portion 20, the rear portion 32, and the peripheral portion 30 may be constructed from a rigid material such as, but not limited to, a polymeric material and may be assembled together via sonic or laser welding. Alternatively, the viewable portion 20, the rear portion 32, and the peripheral portion 30 may be assembled together via low-pressure insert molding, or any other method known in the art, such as through the utilization of adhesives.

Portions of the housing 26 that are readily visible (e.g., the peripheral portion 30 and viewable portion 20) may be colored any color or may be metalized to give any desired portion of the badge 10 a metallic appearance. With respect to the illustrated embodiment, the peripheral portion 30 may be metalized to give the badge 10 a metallic outer appearance thereon. For example, a metallic layer may be applied to the peripheral portion 30 via partial vacuum deposition. The metallic layer should be transparent and/or translucent to allow light to pass therethrough from an inner side 56 to an outer side 58.

Similarly, the indicia 36 disposed on the viewable portion 20 may also confer a metallic appearance. According to one embodiment, the indicia 36 may have a metallic layer disposed thereon that is applied via partial vacuum deposition. Accordingly, the indicia 36 may illuminate when the first LED sources 46 is illuminated and confer a metallic appearance in the illuminated state.

According to an alternate embodiment, a metallic layer may be applied to any portion of the housing 26 via electroplating a thin layer of chromium thereon. Alternatively still, an imitator of chrome may be used for aesthetic purposes. The metallic layer should be light permeable to allow light to pass therethrough from an inner side 56 to an outer side 58. Alternate processes may be used for coloring or layering material onto a portion of the housing 26, as known in the art without departing from the teachings provided herein.

The background region 34 may also be colored any desired color and/or incorporate a metallized finish on portions thereof. According to one embodiment, the background region 34 employs a translucent blue color thereby partially concealing the components of the badge 10 disposed rewardly of the viewable portion 20.

Referring still to FIG. 3, the first, second, and third light sources 38, 42, 44 may be provided on a substrate 60 that may be configured as a flexible printed circuit board (PCB) 62 that is secured inside the housing 26. The light source(s) 38, 42, 44 may be disposed on the PCB 62 and orientated towards the viewable portion 20. A plurality of first LED sources 46 may each be positioned below corresponding light guides 52 to direct light towards a desired location proximate the viewable portion 20. Optionally, the first, second or third LED sources 46, 48, 50 may include focusing optics to help concentrate light onto the corresponding locations and/or towards a specific light guide 52. The PCB 62 may include a white solder mask 64 to reflect light incident thereon. With respect to the embodiment shown in FIG. 3, a portion of the light emitted from the light sources 38, 42, 44 may be transmitted through the viewable portion 20. Another portion of the converted light may be emitted into the interior of the housing 26 and become incident on the white solder mask 64 of the PCB 62. As a result, the light may be redirected back toward the viewable portion 20 and outputted from the housing 26. This may help to ensure that the viewable portion 20 exhibits an optimal amount of illumination.

A plurality of third LED sources 50 may be disposed outwardly of the first and second LED sources 48 on the PCB 62. A reflective member 66 may be disposed substantially forwardly of the plurality of third LED sources 50 and within the housing 26. The reflective member 66 may be configured to direct light emitted from the plurality of third LED sources 50 outwardly through the peripheral portion 30 of the badge 10. The light emitted through the peripheral portion 30 may be of any color and may be directed towards any desired feature 68 (FIG. 4) of the vehicle 14 disposed proximately to the badge 10. Alternatively, the third plurality of LED sources 50 may be oriented towards the periphery 30. For example, the third plurality of LED sources 50 may be disposed on and oriented outwardly from the reflective member 66.

Figure 4:
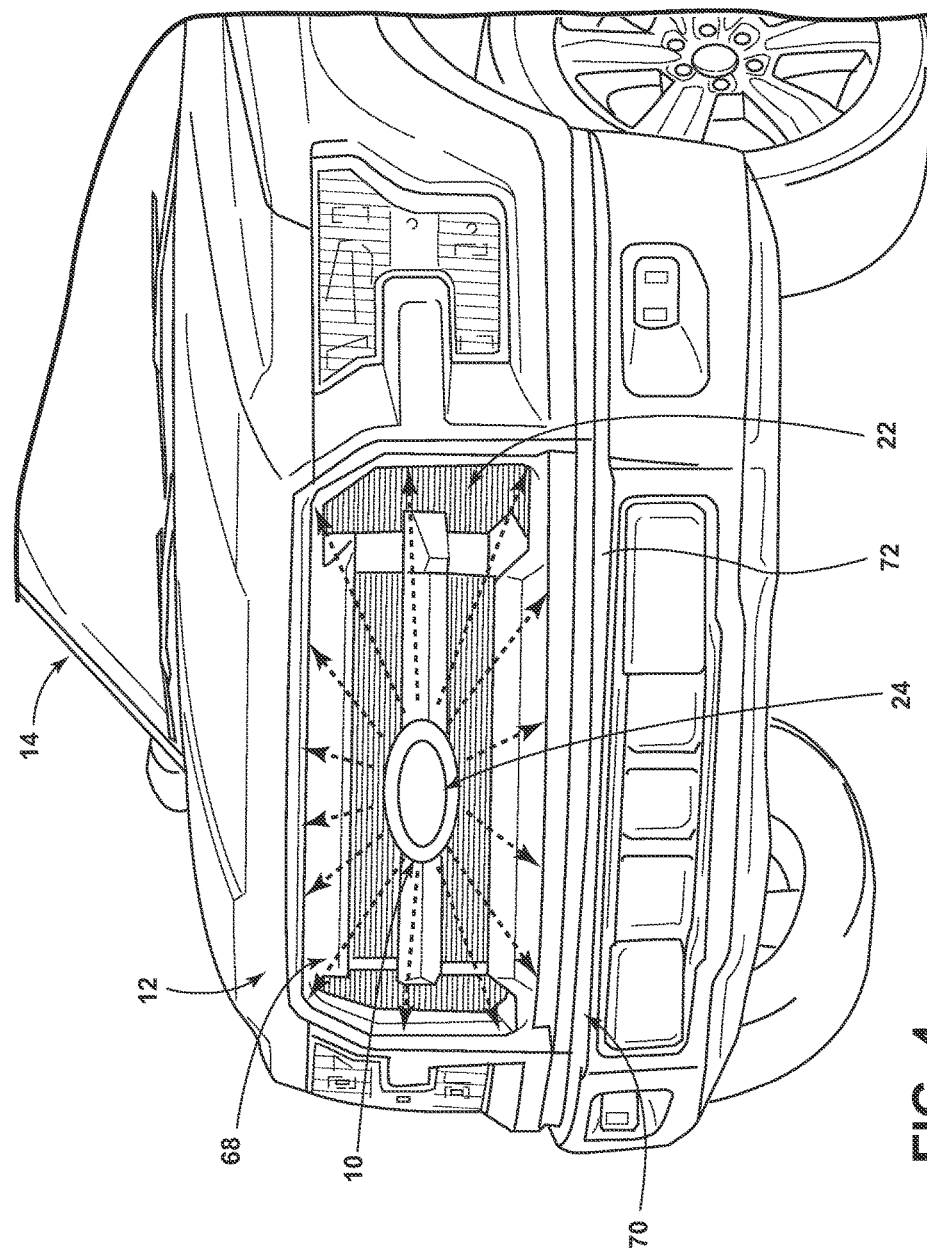
FIG. 4 is a perspective view of a badge mounted on and configured to illuminate the front portion of a vehicle.

As illustrated in FIG. 4, the badge 10 may be centrally disposed on the grille assembly 22 of the vehicle 14. Any practicable means may be used for attaching the badge 10 to the vehicle 14. The rear portion 32 may be substantially linear and may be a dark, high gloss material, thereby concealing any circuitry of the badge 10 and attachment points.

The peripheral portion 30 of the badge 10 may be formed from a translucent, or transparent, material such that light may be emitted therethrough, as described above. The light emitted through the peripheral portion 30 may be configured to act as a wash light to illuminate a feature 68 of the vehicle 14, such as a portion or substantially all of the grille assembly 22 of the vehicle 14. Accordingly, optics may be employed such that light emitted through the peripheral portion 30 may be directed towards specific locations at varying distances from the badge 10. More specifically, grille assemblies 22 commonly have a rectangular configuration. As such, light emitted from the side portions of the peripheral portion 30 may be directed to a further distance than light emitted from the top and bottom portions of the peripheral portion 30.

Additionally, or alternatively, the badge 10 may also be configured to simultaneously illuminate a second vehicle feature 70 disposed proximately to the badge 10. For example, the badge 10 may also direct a portion of light through the bottom portion of the peripheral portion 30 towards the bumper 72 of the vehicle 14 to accentuate features 68, 70 thereof. The controller 54 may control the illumination of a plurality of vehicle features 68, 70. For example, the controller 54 may illuminate a first portion of the plurality of third LED sources 50 that are configured to direct light at a single, desired feature 68. Alternatively, the controller 54 may illuminate a second portion of the third LED sources 50 that are configured to illuminate a plurality of vehicle features 68, 70 disposed proximately to the badge 10 simultaneously.

It should be appreciated that the badge 10 may be disposed on any desired portion of a vehicle 14. Accordingly, the badge 10 may illuminate any exterior feature 68 and/or any area disposed proximately to the exterior of the vehicle 14 without departing from the teachings provided herein. For example, the badge 10 may be disposed on the rear portion 16 (e.g., the tailgate) of the vehicle 14 and illuminate portions of the respective tailgate, a license plate, a rear bumper, a step integrally formed on the vehicle 14, a hitch attached to the vehicle 14, and/or a portion of the ground disposed proximately to the rear of the vehicle 14.

Figure 5:
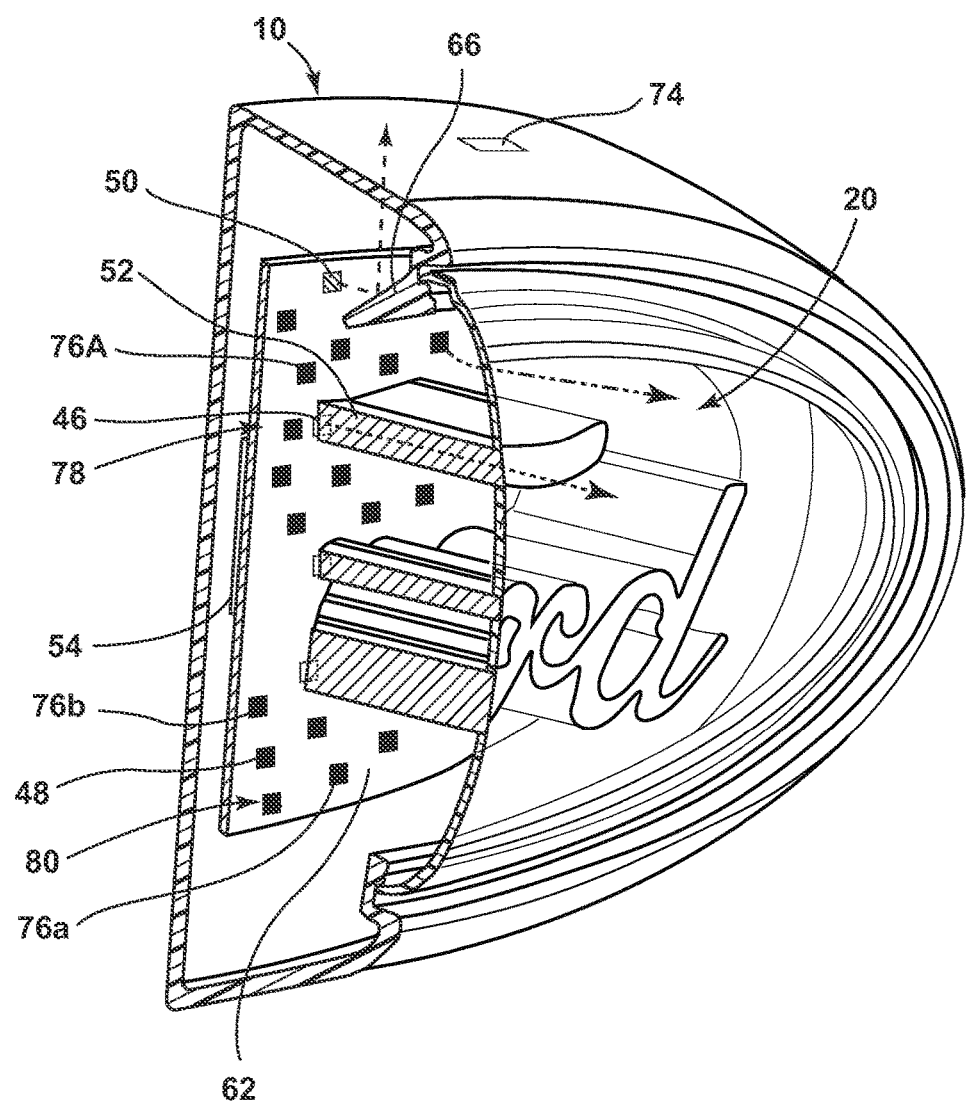
FIG. 5 is a perspective cross-sectional view of the badge taken along line V-V of FIG. 2 having a plurality of light sources configured to illuminate multiple portions of the badge.

As illustrated in FIG. 5, the controller 54 is configured as an independent component that is disposed within the badge 10. With an independent controller 54, the badge 10 may independently function while relying on the vehicle 14 for power supply 40. However, it should be appreciated that the badge 10 may incorporate an individual power supply 40 as well. Moreover, the controller 54 may be disposed within the vehicle 14 and may be configured to control illumination of the badge 10 and/or any other vehicle function.

The badge 10 includes a plurality of first LED sources 46 disposed below corresponding light guides 52. In some embodiments, the plurality of first LED sources 46 may be disposed directly below corresponding light guides 52. The light guides 52 direct light emitted from a plurality of first LED sources 46 toward the viewable portion 20. The plurality of second LED sources 48 is dispersed randomly on the PCB 62. According to one embodiment, the second LED sources 48 are dispersed on the PCB 62 through a printing process. However, in alternate embodiments, the plurality of second LED sources 48 may be disposed in any desired manner in order to form any desired lighting effect from the badge 10. The plurality of third LED sources 50 emits light towards the reflective member 66 that consequently directs light through the peripheral portion 30 of the housing 26. As discussed above, each first, second, and third LED source 46, 48, 50 that creates each respective first, second, and third light source 38, 42, 44 may be independently controllable. Accordingly, each light source 38, 42, 44 and LED sources 46, 48, 50 therein may be independently illuminated for any desired reason.

In operation, each light source 38, 42, 44 may be activated using a variety of means. For example, the badge 10 may include a user interface 74 on the badge 10 and/or within the vehicle 14. The user interface 74 may be configured such that a user may control the wavelength of inputted light that is emitted from each light source 38, 42, 44 and/or the LED sources that form each light source 38, 42, 44. Alternatively, the user interface 74 may be used to switch the badge 10 through a plurality of modes and/or functions. The user interface 74 may use any type of control known in the art for control the light source 38, 42, 44, such as, but not limited to, switches (e.g., proximity sensors, push-type buttons) and may be disposed in any practicable location. Additionally, or alternatively, the light source 38, 42, 44 may be automatically activated via an onboard vehicle system such as the vehicle security system and/or other vehicle system. For instance, sequential illumination may occur as part of a welcome or farewell sequence, meaning that the sequential illumination may occur as an occupant of the vehicle 14 leaves and/or approaches the vehicle 14 employing the illuminated badge 10. It is contemplated that the badge 10 may have a wide range of target locations such that the badge 10 may be used for a plurality of functions.

With further reference to FIG. 5, according to one embodiment, the plurality of first LED sources 46 may illuminate in a first color and the plurality of second LED sources 48 may illuminate in a second color. For example, the plurality of first LED sources 46 may be configured to emit white light and the plurality of second LED sources 48 may be configured to emit a blue light. Moreover, the plurality of second LED sources 48 may confer a shaded appearance on the viewable portion 20 when illuminated. Such an appearance may be created through varying the wavelength of light emitted from each respective second LED source 48. For example, an upper region 78 of the PCB 62 may include second LED sources 48, exemplarily shown as 76a, which emit light having a first wavelength. The lower region 80 of the PCB 62 may include a combination of second LED sources 48 having the first wavelength, exemplarily shown as 76a, and second LED sources 48, exemplarily shown as 76b, with a shorter, second wavelength, which emit a deeper blue color, thereby causing the lower region 80 to illuminate in a darker color than the upper region 78. Alternatively, the second LED sources 48 disposed on the upper region 78 of the PCB 62 may run at a higher intensity than the second LED sources 48 disposed in the lower region 80 of the PCB 62. Through the use of second LED sources 48 having varying hues of color, the background region 34 may confer a shaded appearance in any environment.

Since lighting conditions may vary depending on a plurality of factors including, but not limited to, the current time, date, and weather conditions, the controller 54 may adjust the intensity of any light source 38, 42, 44 such that illumination of the badge 10 may be noticed under any condition. For example, the light intensity in Florida during a clear summer afternoon will generally be higher than the light intensity in Michigan during an overcast summer morning. Thus, by making this type of information known to the controller 54, the controller 54 can adjust any light source 38, 42, 44 accordingly.

The controller 54 may modify the intensity of the light emitted from any light source 38, 42, 44 by pulse-width modulation or current control. In some embodiments, the controller 54 may be configured to adjust a color of the emitted light by sending control signals to adjust an intensity or energy output level of any of the light sources 38, 42, 44. By adjusting the range of intensities that may be output from any light source 38, 42, 44, the plurality of second LED sources 48 within the badge 10 may confer any desired effect (e.g., a shaded appearance) through the viewable portion 20. Moreover, varying the range of intensities of the light sources 38, 42, 44 may accentuate any appearance features of the badge 10.

Figure 6A:
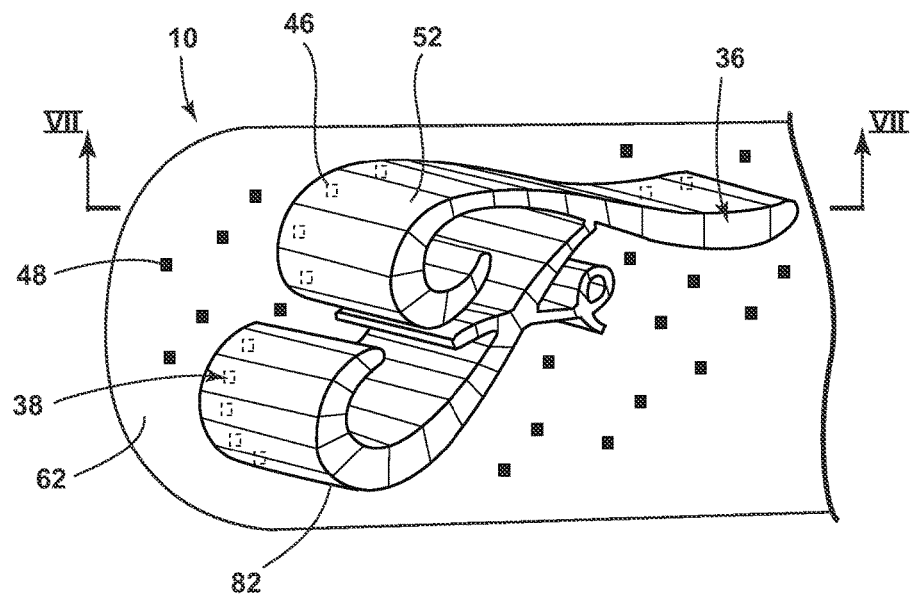
FIG. 6A is a perspective view of a plurality of light guides that form a first portion of indicia disposed within the badge.
Figure 6B:
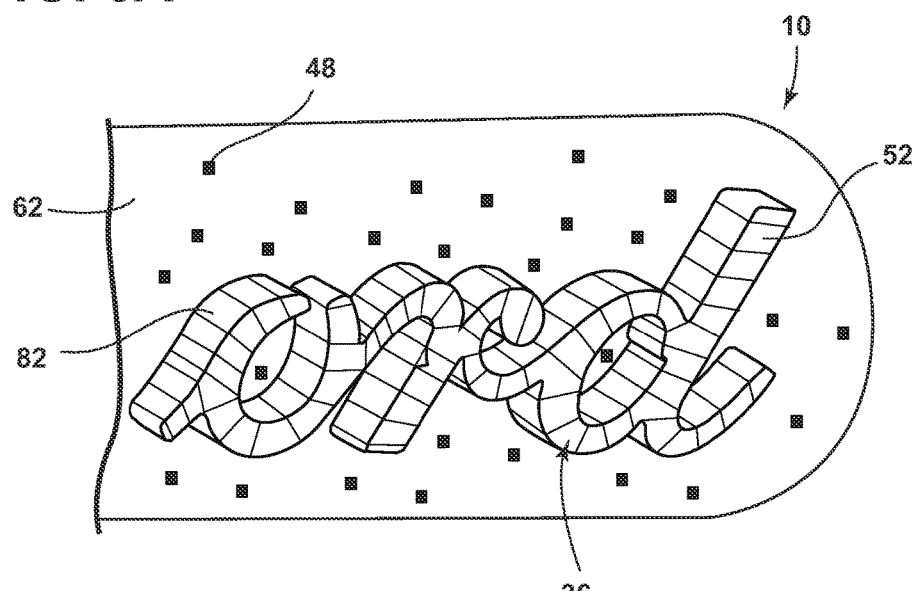
FIG. 6B is a perspective view of a plurality of light guides that form a second portion of indicia disposed within the badge.

As illustrated in FIGS. 6A-6B, each light guide 52 is disposed above a respective first LED source 46 that is independently controlled by the controller 54. As shown in FIG. 6A, a single letter may be formed from the plurality of light guides 52. Or, alternatively, as shown in FIG. 6B, the plurality of light guides 52 may be disposed proximately and connectedly to additional letters such that a plurality of letters may be formed as one component.

The light guide 52, in the illustrated embodiment, is made of a clear acrylic material or another transparent and/or translucent thermoplastic. Although the light guide 52 is shown with a generally rectangular shape, one of ordinary skill in the art would recognize that the light guide 52 could be tubular, elliptical, or have a discontinuous perimeter.

Art opaque material 82 may be disposed on a longitudinal exterior surface of each light guide 52 to prevent light directed through one tight guide 52 from bleeding into a second, proximately disposed light guide 52. The opaque material 82 may also prevent light from the second and/or third LED sources 48, 50 from being directed through the light guides 52 and outwardly to form and/or through the indicia 36.

A wide variety of multi-material injection molding processes may be used for making the light guides 52 that illuminate the indicia 36. Due to fabrication and assembly steps being performed inside the molds, molded multi-material objects allow significant reduction in assembly operations and production cycle times. Furthermore, the product quality can be improved, and the possibility of manufacturing defects and total-manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

With further reference to FIGS. 6A-6B, according to one embodiment, a multi-shot molding process is used to create the indicia 36. Additional optics may also be molded into the indicia 36 during the multi-material injection molding process. Initially, the viewable portion 20 of the housing 26 is formed through a first injection-molding step. A plurality of light guides 52 are then molded and coupled to viewable portion 20 in a second injection-molding step. In alternative embodiments, additional components may be added during any of injection steps, or successively added in additional injections to adhere additional components to the badge 10. For example, the opaque material 82 disposed on the longitudinal surface of the light guide 52 may be molded onto each respective light guide 52. Additional coloring may be applied to any component of the badge 10 to achieve a desired color or to make a surface have a specific property, such as a desired level of reflectivity.

A metallic material may be applied to the viewable portion 20 thereby forming indicia 36 thereon. The light guides 52 may contact an interior side of the viewable portion 20 and direct light through the indicia 36 on the viewable portion 20. Alternatively, a top surface of each light guides 52 may have a metallic appearance such that the indicia 36 is formed from the light guides 52 and is metallic in an unilluminated state. Alternatively still, a metallic, translucent material may be disposed between the viewable portion 20 and the light guides 52.

Still referring to FIGS. 6A-6B, as each respective first LED source 46 is illuminated, each respective light guide 52 directs light emitted from the first LED source 46 towards the viewable portion 20 of the badge 10. Such a configuration allows for the badge 10 to sequentially, or progressively, illuminates portions thereof. For example, the plurality of first LED sources 46 may sequentially illuminate portions of the indicia 36 such that the indicia 36 illuminates as if the indicia 36 were being written on the badge 10 in a desired font. As each first LED source 46 illuminates, the controller 54 may gradually increase the intensity of emitted light. The sequential illumination may occur as part of a welcome or farewell sequence, meaning that the sequential illumination may occur as an occupant of the vehicle 14 leaves and/or approaches the vehicle 14 employing the illuminated badge 10. However, it should be appreciated that the badge 10 may illuminate in any pattern for any desired reason and/or based on any predefined event.

Figure 7:
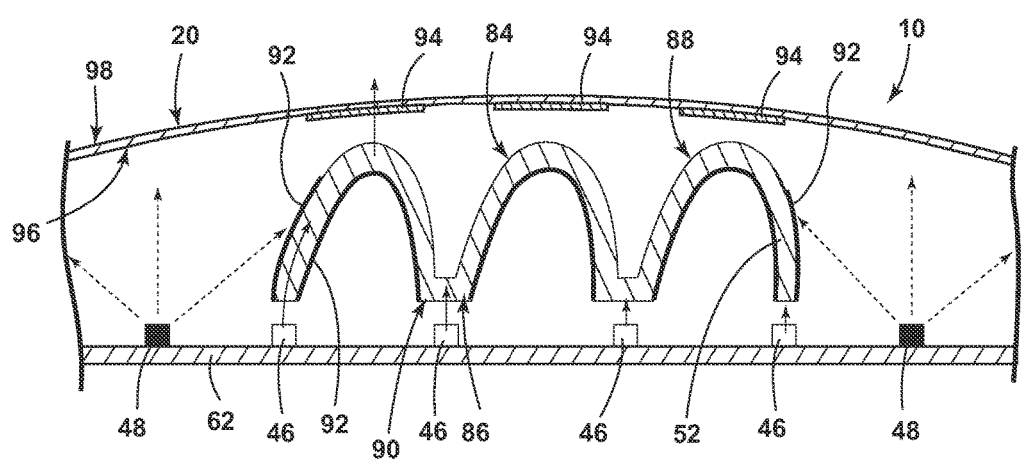
FIG. 7 is a cross-sectional view of the badge, according to one embodiment, taken along lines VII-VII of FIG. 6 showing the badge having a light guide extending above a plurality of LED sources.

Referring to FIG. 7, a single light guide 52 extending over multiple first LED sources 46 is disposed above the plurality of first LED sources 46 and below the viewable portion 20. The light guide 52, as illustrated, includes a plurality of inverted U-shaped portions 84 that are connected to adjacently disposed portions 86. A distal portion 88 of each U-shaped portion 84 is disposed proximately to the viewable portion 20 of the badge 10. A proximal portion 90 is disposed proximately to each individually controlled first LED source 46. As each first LED source 46 is illuminated, the distal portion(s) 88 of the light guide 52 disposed near to the first LED source 46 may emit light therefrom. As the first LED sources 46 are simultaneously illuminated, the indicia 36 disposed proximately to the distal portions 88 of the light guide 52 will progressively become illuminated. The sequential illumination may confer an appearance as if the indicia 36 are being written by hand as each letter sequentially becomes illuminated.

A reflective material 92 may be disposed on portions of the light guide 52 such that incident light (i.e., light from the plurality of second LED sources 48) may be prevented from mixing with light emitted from the plurality of first LED sources 46. The reflective material 92 may be an additional layer of material, such as paint, that is adhered to the desired portions of the light guide 52. Accordingly, the indicia 36 may maintain a desired color while substantially preventing the light emitted from other portions to combine and affect the color of the illuminated indicia 36 displayed on the viewable portion 20.

A light diffuser 94 may be molded, or alternatively mounted, between the viewable portion 20 of the housing 26 and the light guides 52. For example, the light diffuser 94 may be a layer that is applied to the underside of the viewable portion 20 via partial vacuum deposition. The diffuser 94 can be transparent or translucent and generally functions to diffuse the light from the light guides 52 so that hot spots and shadows are eliminated. The inner surface 96 and/or outer surface 98 of the viewable portion 20 may be coated, roughened or receive micro-faceting to aid in the light diffusion performance. Additionally, or alternatively, the diffuser 94 may be applied to a portion of the light guide 52 in order to optimize the light diffusing effect. In alternate embodiments, a light diffusing material 94 may be applied to or disposed on some or all of the light sources 38, 42, 44 disposed within the badge 10.

Figure 8:
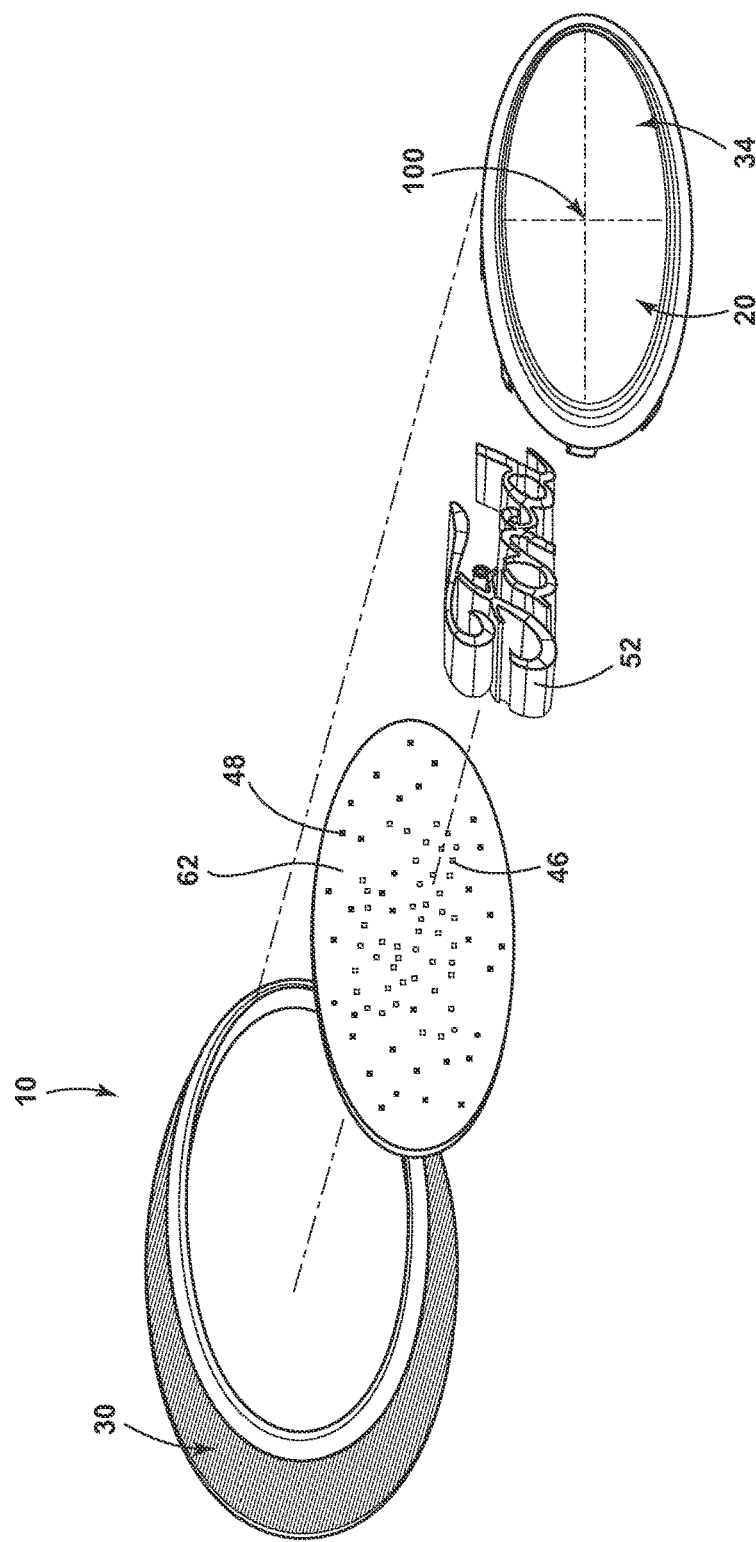
FIG. 8 is an exploded view of the badge, according to one embodiment.

Referring to FIG. 8, a first LED source 46 is disposed under each respective light guide 52 such that light may be independently directed from each first LED source 46 towards the viewable portion 20 in a desired pattern. A plurality of second LED sources 48 is randomly disposed around the plurality of first LED sources 46.

According to one embodiment, the badge 10 may flash or otherwise illuminate based on the meeting of a predefined condition. For example, when an occupant is located beyond a predefined distance from the vehicle 14, for example 15 feet from the vehicle 14, but not approaching the vehicle 14 the badge 10 may illuminate in a predefined pattern. According to an alternate embodiment, the indicia 36 may become illuminated, then slowly return to a substantially unilluminated state centering on the central location of the indicia 36. When a substantially unilluminated state (e.g., nearly, but not all, of the first or second LED sources 46, 48 are in an unilluminated state) is achieved, the first or second LED sources 46, 48 may begin to illuminate the indicia 36 again.

According to an alternate embodiment, the plurality of first LED sources 46 may maintain an unilluminated state thereby making the indicia 36 have a metallic appearance. Simultaneously, the plurality of second LED sources 48 may illuminate at varying intensities such that the intensity of light emitted through the background region 34 is varied over time. A central region 100 of the viewable portion 20 may stay illuminated as the badge 10 varies the intensity of light emitted therefrom. Alternatively still, the first and second LED sources 46, 48 may each vary the intensity of light emitted therefrom simultaneously such that the badge 10 illuminates at varying intensities of light in a plurality of colors contemporaneously. During illumination, both the first and second LED sources 46, 48 may emit a higher intensity or amount of light towards a predefined location (e.g., a central region 100) of the viewable portion 20.

The controller 54 may have corrective algorithms that permit precise adjustment of the light sources 38, 42, 44 to compensate for color shifts, etc., over time. Furthermore, when sequentially illuminating the first LED sources 46 within the badge 10, specific algorithms can be implemented to effect a smooth transition, which is not necessarily a linear adjustment of each respective color. Thus, to adjust from 0% brightness to 100% brightness, a linear adjustment might introduce an undesirable effect in the transition. Thus, in one embodiment, specific look-up tables (LUTs) can be provided that is used by the controlling processor 106 (FIG. 10) and/or controllers 54 containing the necessary brightness values for properly adjusting during the transition. The control may be affected using software algorithms specifically designed for creating desired patterns and controlling the transitions thereof.

Figure 9:
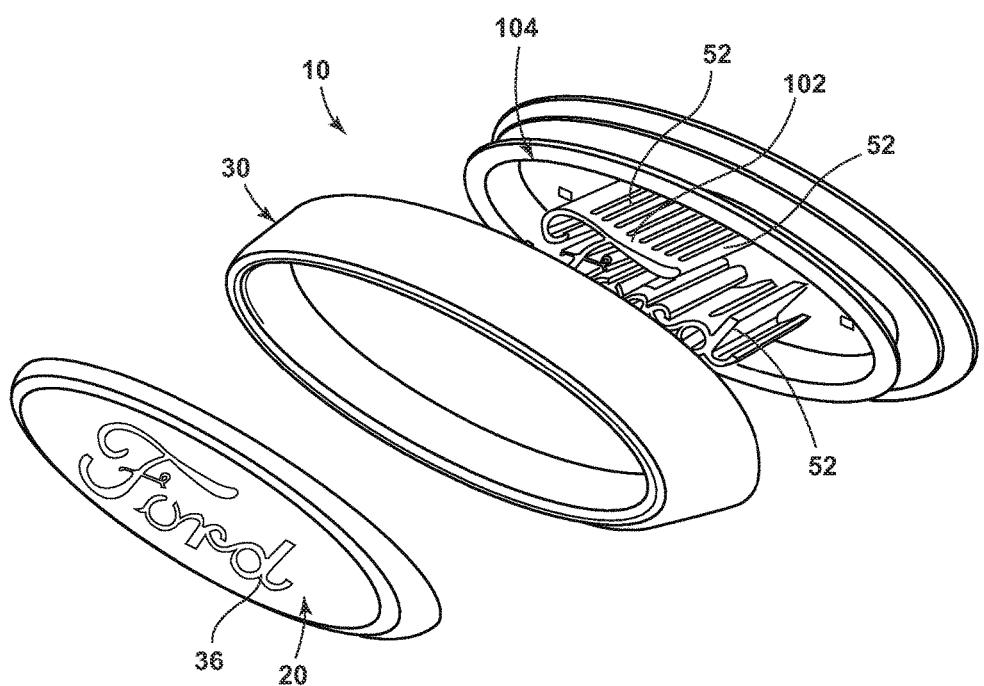
FIG. 9 is an exploded view of the badge, according to one embodiment, having a plurality of first light guides that extend outwardly from the light source and a transversely extending second light guide disposed on across a forward portion of the plurality of first light guides.

Referring to FIG. 9, according to one embodiment, a plurality of first light guides 52 extend forwardly from the plurality of first light sources 46 and towards the viewable portion 20 of the badge 10. The first light guides 52 may have a uniform thickness, or alternatively, may vary in thickness along the indicia 36. A second, transversely extending light guide 102 may extend along a front portion of the first light guide 52, or a plurality of adjacently disposed first light guides 52. The second light guide 102 may be configured to blend and/or diffuse light emitted through each of the first light guides 52 as each sequential first light source 38 is illuminated. It will be appreciated that the badge may include any number of second light guides 102 extending over any number of first light guides 52. For example, the second light guide 102 may extend across a single first light guide in some portions of the badge 10 and an alternate second light guide 102 may extend over a plurality of first light guides 52 in alternate portions of the badge 10.

The first light guide 52 and second light guide 102 may be a single, integrally formed component. For example, the first light guide 52 and second light guide 102 may be formed through an injection molding process, or any other practicable process known in the art. Alternatively, the first light guide 52 and second light guide 102 may be attached and/or coupled to one another through any means known in the art. Additionally, the second light guide 102 may be in any angular and/or relational orientation to the first light guide 52 and need not be transversely disposed thereon such that the first light guide 52 and second light guide 102 are optically coupled to one another.

As light emitted from the sequential illumination of each first light source 38 is directed through the first light guide 52 and the second light guide 102, uniform blending may be accomplished. Moreover, the thickness of the second light guide 102 may be varied to affect the blending characteristics thereof. For example, a thinner second light guide 102 may create brighter, distinct points forwardly of the plurality of first light guides 52. Alternatively, a thicker second light guide 102 may lead to smaller defined bright spots and more uniform blending as each sequential first light source 46 is illuminated. It will be appreciated that the thickness of the second light guide 102 may also be varied along the length thereof such that the second light guide 102 has varied blending characteristics therealong.

With further reference to FIG. 9, each first light guide 52 may have a void therebetween. The void between each first light guide 52 may assist in directing light towards predefined locations while also preventing light directed through a first light guide 52 from illuminating adjacently disposed first light guides 52. As discussed above, a reflective, or light absorbent, material 92 may be disposed on portions of the first light guide 52 such that incident light may further be prevented from adjacently disposed components of the badge 10.

Still referring to FIG. 9, the badge 10 may include a circumferential extension 104 protruding forwardly from the rear portion 32 of the badge 10. The circumferential extension 104 may provide support for the peripheral portion 30. Additionally, or alternatively, the third plurality of light sources 44 may be disposed on the circumferential extension 104 and oriented outwardly therefrom. The circumferential extension 104 may be a separate component or integrally formed with any other portion of the badge 10.

Figure 10:
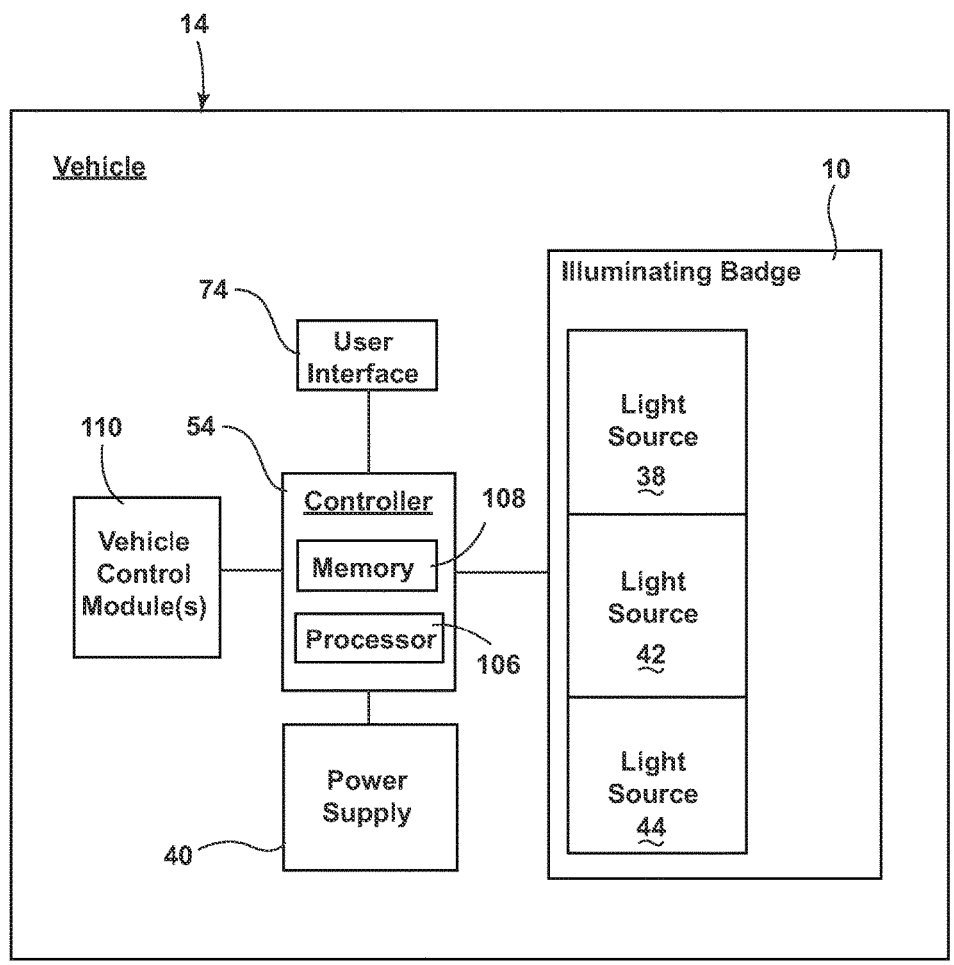
FIG. 10 is a block diagram of the vehicle and the badge.

Referring to FIG. 10, a box diagram of a vehicle 14 is shown in which an illuminated badge 10 is implemented. The badge 10 includes a controller 54 in communication with the first, second and third plurality of LED sources 46, 48, 50. The controller 54 may include memory 108 having instructions contained therein that are executed by a processor 106 of the controller 54. The controller 54 may provide electrical power to any light source 38, 42, 44 via a power supply 40 located onboard the vehicle 14 and/or within the badge 10. In addition, the controller 54 may be configured to control the light output of each LED source 46, 48, 50 independently based on feedback received from one or more vehicle control modules 110 such as, but not limited to, a body control module, engine control module, steering control module, brake control module, the like, or a combination thereof. By controlling the light output each of the first, second and third LED sources 46, 48, 50 independently, the badge 10 may illuminate in a variety of colors and/or patterns to provide an aesthetic appearance, such as a written script appearance, or may provide vehicle information to an intended observer. For example, the illumination provided by the badge 10 may be used for numerous vehicle applications, such as, but not limited to, an aesthetic feature, a car finding feature, a remote start indicator, a door lock indicator, a door ajar indicator, a running light, etc.

In operation, the badge 10 may exhibit a constant unicolor or multicolor illumination. For example, the controller 54 may prompt a first LED source 46 within the badge 10 to illuminate in first color thereby illuminating indicia 36 disposed on the badge 10. Simultaneously, a second LED source 48 may illuminate in a second color to illuminate a background region 34 of the viewable portion 20. A third LED source may emit light towards a reflective member 66 thereby directing light through a peripheral portion 30 of the housing 26. As discussed above, each light source 38, 42, 44 may be independently illuminated by the controller 54 such that the viewable portion 20 may illuminate in a plurality of predefined patterns.

According to one embodiment, the badge 10 may include a plurality of first LED sources 46 that sequentially illuminate such that indicia 36 on the viewable portion 20 are progressively illuminated. Also, the controller 54 may vary power to each light source 38, 42, 44 from 1 to 5 times steady state current to vary the color and brightness of light emitted from each respective light source 38, 42, 44. The light sources 38, 42, 44 may also illuminate multiple colors concurrently, thereby producing additional color configurations.

In another embodiment, the controller 54 illuminates only the first, second, or third light source 38, 42, 44 independently. For example, the controller 54 may prompt the first light source 38 to sequentially illuminate indicia 36 disposed on the viewable portion 20 of the badge 10. Alternatively, the controller 54 may prompt a plurality of second LED sources 48 to have varied intensities such that the background region 34 of the viewable portion 20 appears shaded. Alternatively still, the controller 54 may prompt the third light source 44 to emit light that is directed outwardly through the peripheral portion 30 of the housing 26. The controller 54 may illuminate each light source 38, 42, 44 in a unique color, or any of the light sources 38, 42, 44 may emit a color of a common wavelength.

In an alternative embodiment, the badge 10 may include a user interface 74. The user interface 74 may be configured such that a user may control the wavelength of inputted light that is emitted by the each light source 38, 42, 44. Such a configuration may allow a user to control which components of the badge 10 and/or features 68 thereof are illuminated.

With respect to the above examples, the controller 54 may modify the intensity of the light emitted from any of the light sources 38, 42, 44 by pulse-width modulation or current control. In some embodiments, the controller 54 may be configured to adjust a color of the emitted light by sending control signals to adjust an intensity or energy output level of any of the light sources 38, 42, 44. By adjusting the range of intensities that may be output from any light source 38, 42, 44, the first, second, and/or third LED sources 46, 48, 50 may be operable to generate a range of color hues of the emitted light. Additionally, varying the range of intensities of any of the light sources 38, 42, 44 may accentuate any appearance features (e.g., shaded appearance) of the badge 10.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle badge, comprising:
   a housing having a viewable portion coupled to a peripheral portion;
   a first light source illuminating indicia;
   a second light source illuminating a background region; and
   a third light source configured to emit light at a reflective member extending from a peripheral portion of the housing towards the first light source and configured to redirect light emitted from the third light source outwardly through the peripheral portion.

2. The badge of claim 1, wherein the first light source is configured as a plurality of independently controlled first LED sources and the second light sources are configured as a plurality of independently controlled second LED sources.

3. The badge of claim 1, further comprising:
   a light guide disposed above the first LED sources configured to direct light from each first LED source towards the viewable portion.

4. The badge of claim 1, further comprising:
   a plurality of light guides disposed above each respective first LED source and configured to direct emitted light therefrom towards the viewable portion, wherein each first LED source is sequentially illuminated.

5. The badge of claim 1, wherein the first light source illuminates in a substantially white color and wherein the second light source illuminates in a non-white color.

6. The badge of claim 4, wherein the each first LED source maintains an illuminated state as each sequential first LED is illuminated.

7. A badge, comprising:
   a housing having a viewable portion; and
   an indicia disposed proximate the viewable portion;
   a plurality of first LED sources disposed within the housing configured to emit light through the indicia;
   a first light guide disposed above the first LED sources and below the indicia, the light guide having an upper portion extending closer to the first LED sources than a central portion, wherein each first LED source is independently illuminated;
   a plurality of second LED sources configured to illuminate a background region of the viewable portion in a second color; and
   a third plurality of light sources configured to emit light through a peripheral portion of the housing to illuminate a feature of a vehicle disposed proximately to the badge, wherein a reflective member is disposed substantially forwardly of the third plurality of light sources and within the housing, the reflective member configured to direct light emitted forwardly from the third plurality of light sources outwardly through a peripheral portion of the housing.

8. The badge of claim 7, wherein the plurality of first LED sources is sequentially illuminated such that the indicia is progressively illuminated.

9. The badge of claim 8, further comprising:
   a controller configured to control a sequential illumination of the first LED sources at a predefined speed between illumination of each respective first LED source, wherein sequential illumination repeats by lighting adjacently disposed first LED sources until each first LED source is illuminated.

10. The badge of claim 7, wherein the plurality of second LED sources emit varying hues of a color of light while the plurality of first LED sources sequentially illuminate indicia disposed on the viewable portion.

11. The badge of claim 7, wherein the second LED sources are disposed on a printed circuit board (PCB) and an upper region of the PCB includes a first portion of second LED sources that emit light of a first wavelength and a lower region of the PCB includes a second portion of second LED sources that emit light of a second wavelength that is varied from the first wavelength.

12. The badge of claim 7, wherein the second light source includes a plurality of LED sources configured to emit light of varied intensities to produce shaded regions along a background region of the viewable portion.

* * * * *

UNITED STATES PATENT AND TRADEMARK OFFICE
CERTIFICATE OF CORRECTION

PATENT NO. : 10,168,039 B2
APPLICATION NO. : 14/876355
DATED : October 6, 2015
INVENTOR(S) : Paul Kenneth Dellock et al.

Page 1 of 1

It is certified that error appears in the above-identified patent and that said Letters Patent is hereby corrected as shown below:

On the Title Page

Item [72] insert:
--[72] Inventors: Paul Kenneth Dellock, Northville, MI (US); Stuart C. Salter, White Lake, MI (US); Pietro Buttolo, Dearborn Heights, MI (US); Aaron Bradley Johnson, Allen Park, MI (US)--.

Signed and Sealed this
Third Day of September, 2019

Andrei Iancu
*Director of the United States Patent and Trademark Office*